Jan. 10, 1939.   J. H. MUNRO   2,143,568
EXTENSIBLE PIPE FITTING

Filed March 30, 1938

INVENTOR.
JOHN H. MUNRO
BY
ATTORNEY.

Patented Jan. 10, 1939

2,143,568

UNITED STATES PATENT OFFICE 2,143,568

EXTENSIBLE PIPE FITTING

John H. Munro, Kew Gardens, N. Y.

Application March 30, 1938, Serial No. 198,800

1 Claim. (Cl. 285—13)

This invention relates to pipe fittings and in particular to the provision of an extensible fitting which permits the joining of two pipes or other fittings together without requiring accuracy in the relation of the pipe ends to each other.

In plumbing, gas fitting, steam fitting, and electrical conduit work, it has always been necessary to terminate the pipes to an accurate position adjacent each other, with the ends of the pipes to be joined separated within close or fixed limits, suitable to receive a standard union. For instance, in fitting up or installing a pipe line, the pipe fitter will bring his connection up to a fitting, and must be careful to cut his pipe to length so as to permit the pipe threads to seal tightly into the fittings, and at the same time, to be positioned adjacent each other at a fixed distance which is sufficient to permit the closing of the union. Often times, it is necessary to use a nipple to aid in making this closure. If the pipe fitter does not happen to have a nipple which fits the particular case at hand, he must cut and thread a nipple of special length. This is the greatest objection to the use of pipe unions, which must be applied with great accuracy, if they are to hold the pressure. In using a pipe union to make the final closure in a pipe line, it is not only necessary to have the distance between the two pipes or fittings to be joined, accurate, so that the faces of the union will fit perfectly, but it is also necessary that the axes of the pipes to be joined be in line, otherwise the sealing seats in union will not seat tight all around. Unless the units of a union seat in a straight line, an opening will be left between the faces on one side, and a leak will develop.

The object of this invention is to provide a special type of self-contained extensible fitting which will not require the accurate spacing of the pipes to be joined. This special fitting is free from all fixed distances, and will accommodate any spacing between the elements to be joined, within its range.

It is desired to provide an extensible fitting which not only will perform a perfect seal against gas, steam, or fluid pressure when used in pipe lines, but also to provide an extensible fitting of the same construction which is adaptable for use in making connections in electrical conduit work. In electrical conduit work, it is necessary to have considerable mechanical strength to assure the proper protection of the wiring, but obviously no pressure-tight seal is required, although it would not be objectionable. The electrical conduit fitter has the same difficulty in joining his pipe, in that he must be accurate in making his connections, as the plumber does in regular pipe fitting.

The device is so designed as to provide an element which is free from soft packings, such as wicking impregnated with graphite; and is designed with tapers which permit the closing of a relatively hard packing upon the pipe after it has been set into the line and adjusted to take up whatever space occurs between the two elements to be joined. This fitting saves the pipe fitter a considerable amount of time, in that all of the accuracy normally required in making the connection is eliminated, and a satisfactory union or coupling at the final closure is assured.

It is planned, of course, to make the fitting with a number of terminal forms, all of which will be adapted to the standard practices in plumbing connections.

To more clearly define the invention, and to illustrate the many forms into which it may be incorporated, reference is made to the accompanying drawing, in which.

Similar reference numerals refer to similar parts throughout the drawing.

Figure 1:
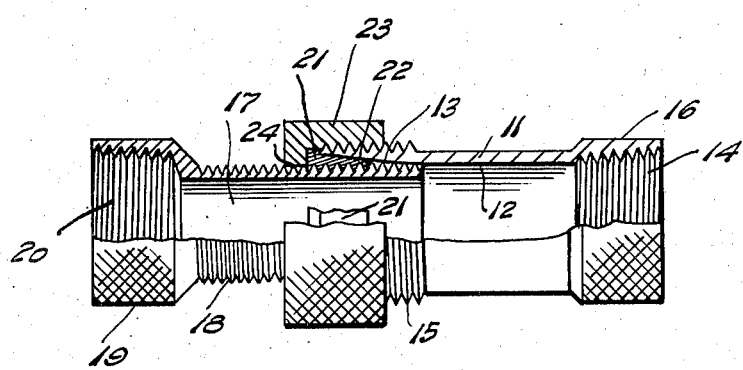
Figure 1 is an elevation partly broken away and sectioned, showing the extensible pipe fitting in which the fundamental construction is disclosed, as adapted to a fitting comprising two female ends.
Figure 2:
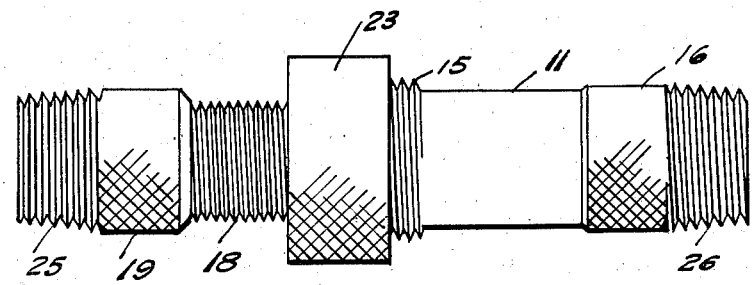
Figure 2 is an elevation showing the extensible fitting equipped with two male ends, which convert the fitting to an extensible nipple.
Figure 3:
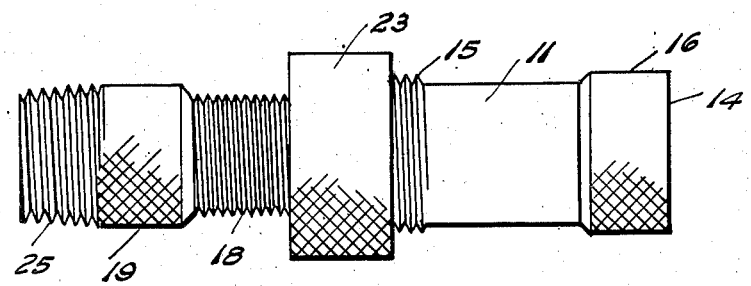
Figure 3 is a similar view to Figure 2, but shows the extensible fitting equipped with one male end and one female end.

In the drawing, 11 is a tube which has a bore 12 therethrough, one end of which has an internal taper 13, the other end 14 being threaded with a pipe tap. This threaded end is adapted to be screwed onto a nipple or the end of a pipe to which the extensible fitting is to be joined. On the outside of the tube, the tapered end has a straight machine thread 15, and the threaded end 14 has a thickened portion 16, which is preferably knurled to form a gripping surface to receive a pipe wrench so that it may be pulled tightly onto the nipple or end of the pipe to which it is to be attached. Obviously, this knurled surface could be replaced by a hexagon or octagonal surface, if desired. This knurled surface likewise provides an easy means to turn the pipe up by hand to a position ready to be tightened by the wrench. A complementary member 17, which is tubular in form, has a straight machine thread 18 of considerable length. This length is dependent upon the amount of adjustment desired. This thread is of a diameter which is sufficient to fit, but clear the diameter of the bore through the part 11. The other end of this complementary part 17 has a thickened or offset portion 19, which is knurled for quick hand-adjustment, and to receive a pipe wrench. The reason for offsetting or thickening the member at the end is in order to provide satisfactory dimensions to accommodate standard pipe threads. This thickened or offset end is threaded to receive a pipe thread 20, formed by a pipe tap, and is adapted to screw onto the end of the other pipe or nipple to complete the junction of the pipes to be connected. It is to be understood that the thread 18 on the tube 17 will freely pass through the bore 12 on the tube 11; that is, the outside diameter of the thread 18 is slightly smaller than the bore 12.
Thus part 17 can slide in and out of the bore 12, and is not threaded to this element. The end 14 of the tube 11, being screwed onto the end of the other pipe to be joined, it is necessary to seal against fluid or pressure along the thread 18 where it rests in the bore 12. To accomplish this, a wedgelock 21, preferably made of a metallic alloy, is threaded to fit the thread 18, and is tapered at 22 to fit the taper 13 in the end of tube 11. The other end of the wedgelock is left with a square-edged shoulder. This shoulder is useful to provide a hold for a wrench in making or breaking the joint. To force the tapered end 22 of the wedgelock 21 into and against the taper 13 on tube 11, a nut 23 is provided, which engages thread 15 on tube 11. This nut is preferably made in a circular form and knurled on its surface for quick hand adjustment, but could be hexagon or octagonal, and for receiving a pipe wrench for tightening it. The nut 23 has an end 24 bored out to closely fit the thread 18, but is not threaded thereto. The inside surface of this wall 24 which is adjacent the wedgelock, is slightly formed to pinch into the wedgelock, and prevent leakage at this point.
In order to make a connection between two female fittings, the extensible connection may be provided with male ends 25 and 26, as shown in Figure 2. In this instance, the male ends 25 and 26 replace the thickened ends 14 and 19 shown in Figure 1. In order to connect two elements, one having a female end and the other a male end, the extensible fitting may be provided with a male end 25 and a female end 14, thus forming a combination between the two arrangements shown in Figure 1 and Figure 2.

In order to connect two pipes together, or any other fittings which are to complete a system, it is necessary only to run these two elements adjacent each other at any distance within the range of the extensible fitting. The extensible fitting as supplied, would be collapsed, that is, the thread 18 would be pushed all the way into the bore 12, and the nut 13 and threaded wedgelock 21 would be moved back along the thread 18 as far as possible, to be out of the way. The tube 17 is then screwed onto the end of the pipe, the thread 20 engaging, and after being turned on by hand as far as possible, it would be tightened with a pipe wrench. The tube 11 is then pulled outward or over the thread 18, to reach the other pipe to be connected and the thread 14 is engaged with the end of the pipe, and turned on by hand as far as possible, and then tightened with a pipe wrench. The distance now has been taken up, and the two ends of the extensible fitting are firmly joined to the pipes to be connected. The wedgelock 21 is now turned along the thread 18, until its tapered end 22 engages the taper 13 on the tube 11. This is tightened as much as possible by hand. The nut 23 which is free to slide over the thread 18, is moved over the wedgelock 21 until its thread engages the thread 15 on the tube 11. This is turned on by hand as far as possible, and then tightened with a pipe wrench. The pressure applied in pulling up the nut 23 against the wedgelock 21, pressed the packing into the taper 13 with considerable force, causing a sealing along the taper 13, and the driving of the threads in the wedgelock 21 firmly against the thread 18 on the part 17, actually reducing the inside diameter of the thread of the wedgelock, and thereby eliminating tolerance. In order to prevent leakage between the inner surface of the end wall 24 and the wedgelock 21, this end wall is slightly formed to pinch into the wedgelock. The wedgelock, being preferably of a metal with a plastic characteristic, fits into all of the surfaces within which it is trapped, and forms a solid seal at this point.

It is to be pointed out that the construction described is free of all fixed dimensions, and that the device is truly extensible, in that it may be moved in or out at will; the thread 18 being threaded to no other element than the wedgelock 21.

It is to be further pointed out that the wedgelock constitutes a packing, and is made from preferably a metal which constitutes a fixed element within itself, which is movable to the desired point of contact before it is set by the squeezing action of the nut.

In the ordinary fitting known as a "long joint" or "long screw" the equivalent of thread 18 is threaded into three elements. This does not provide an extensible joint, as it is limited to fixed dimensions, and the threading on to the pipes to be joined tends to unscrew the fitting itself which is adjusted by solid thread, and in every known instance, the packing itself is of such a loose plastic nature, that it does not constitute a mechanical part which may be threaded along the pipe by itself, and the thread in the packing is formed by the pressure of the joint.

This invention contemplates the pre-threading of the wedge-lock and the movement of the packing as a mechanical element along the fitting thread before the seal is formed.

Having described the invention, what is claimed as new and is desired to be secured by Letters Patent, is:

An extensible pipe coupling for insertion between two fixed elements, comprising an outer member having a conical recess at the end, an externally threaded inner member adapted to be slidably received in said outer member, a relatively soft metallic packing sleeve having an internal thread to coact with the external thread of the inner member, and a nut threaded to the outer member and slidably engaging the inner member for forcing said packing ring into said conical recess, the construction and arrangement being such that the packing sleeve can be tightened by distortion without relative shifting between the outer and inner members.

JOHN H. MUNRO.